United States Patent [19]
Thompson

[11] Patent Number: 5,145,015
[45] Date of Patent: Sep. 8, 1992

[54] WELL POINT

[76] Inventor: George A. Thompson, 114 DeMotte Ave., Daytona Beach, Fla. 32019

[21] Appl. No.: 644,817
[22] Filed: Jan. 23, 1991
[51] Int. Cl.$^5$ ............................................. E21B 7/26
[52] U.S. Cl. ..................................... 175/21; 166/228
[58] Field of Search .................. 175/21, 424; 239/271, 239/272, 575, 570, 571; 166/228, 236

[56] References Cited

U.S. PATENT DOCUMENTS

| | | | |
|---|---|---|---|
| 2,835,328 | 5/1958 | Thompson | 175/21 X |
| 2,838,120 | 6/1958 | Allmendinger et al. | 175/21 X |
| 4,649,996 | 3/1987 | Kojicic et al. | 166/228 |
| 4,700,776 | 10/1987 | Petrovic | 175/21 X |

Primary Examiner—William P. Neuder
Attorney, Agent, or Firm—Sughrue, Mion, Zinn, Macpeak & Seas

[57] ABSTRACT

A well point assembly is provided with a central, hollow, rectangular tube having a plurality of elongated slots extending axially from end thereof. Opposite ends of the tube are fitted in end members having complementary recesses with the slots being substantially longer than the recess in one of the end fittings to provide for the direct passage of water into and out of the tube. The hollow plastic tube has a plurality of slits therein surrounds the central tube and is secured to the opposite end fittings. The one way valve assembly is provided in the lower end fitting so that upon the passage of pressurized water through the central tube, the valve will be open to provide a water jet outwardly of the lower end and upon the application of a suction to the central tube, the valve will be closed and water will be drawn through the screen and the slots in the central tube to be pumped to the surface.

3 Claims, 2 Drawing Sheets

WELL POINT

BACKGROUND OF THE INVENTION

The present invention relates to an improved well point of the type employed to de-water subsurface excavations.

Well points of the type to which this invention relates are exemplified in U.S. Pat. Nos. 1,915,136 issued Jun. 20, 1933, 2,027,398 issued Jan. 14, 1936 and 2,388,640 issued Nov. 6, 1945, which patents give excellent disclosures of the manner in which such a well point is used.

Applicant's own prior U.S. Pat. No. 2,835,328 issued May 20, 1958 is also directed to a well point designed to facilitate the rapid extraction of water from subsurface formations. The well point disclosed in this patent included a tube of rectangular cross-section having external interrupted screw threads on its corners adjacent one end, an internally screw threaded coupling socket fixed to the tube and extending longitudinally from the end thereof remote from the threads, an annular flange carried by the socket and extending therefrom toward the threaded end of the tube in spaced relation to the tube, a tubular screen encircling the tube and extending into the space between the tube and the flange, an earth penetrating tip threadedly engaged with the tube for engaging the screen and removably holding it in place on the tube, said tip having a liquid discharge chamber therein which establishes communication between the interior of the screen and the exterior of the tube. A spacer rod is secured to each side of the tube for engaging the screen and preventing its collapse under external pressure with opposite ends of the spacer rod diverging from the tube as they approach the end thereof for yieldingly engaging the screen and assuring a sand-tight connection with the socket and the tip.

While the above described well point performed well under certain circumstances, there was a tendency for the screen to become clogged in some types of soil and to be deformed under pressure with a resultant separation of the screen from the socket and/or the tip. Further, the restricted space between the lower end of the tube and the tip where the tube is threadedly engaged with the tip unduly restricted the flow of water into the discharge chamber when suction was applied to the tube. Finally, the foregoing construction of all metallic parts was expensive to build, time consuming to assemble and rather heavy and cumbersome to handle.

SUMMARY OF THE INVENTION

The present invention provides a new and improved well point which is lightweight, economical and easy to assemble.

The present invention provides a new and improved well point which provides for the rapid extraction of water from subsurface formations by facilitating the flow of water through the well point.

The present invention provides a new and improved well point construction comprising an elongated tube of rectangular cross-section having a protruding rib extending the entire length of each side of the tube, a cylindrical jet head assembly having a one way valve means therein and a reduced diameter cylindrical end portion having a rectangular recess therein with a groove in each side of the recess and a depth sufficient to securely receive one end of said tube, a plurality of elongated slots extending from said one end of said tube in each side thereof a distance greater than the depth of said recess, a cylindrical top end fitting including a reduced diameter cylindrical portion having a rectangular recess therein with a groove in each side of said recess and a depth sufficient for securely receiving an opposite end of said tube, means securing each end of said tube in a respective recess and a hollow cylindrical screen fitted over said tube with opposite ends of said tube secured to said reduced diameter cylindrical end portion of said jet head assembly and said reduced diameter cylindrical portion of said top end fitting, respectively.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
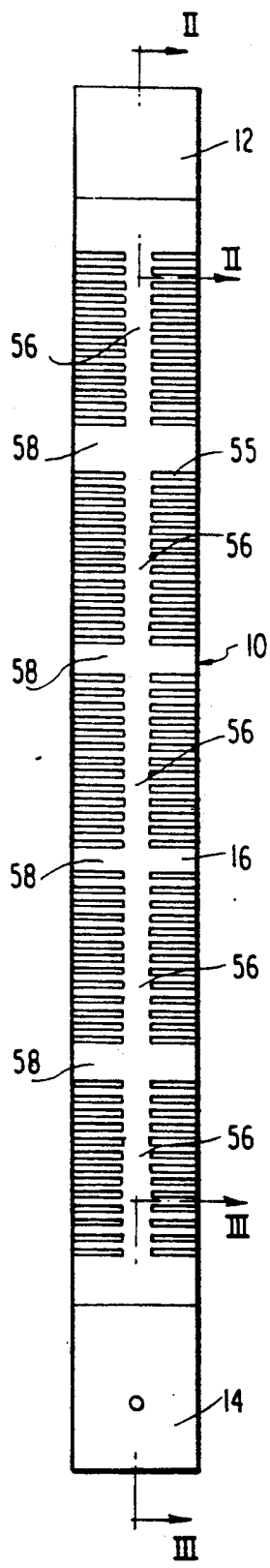
FIG. 1 is a side elevation view of the well point according to the present invention.

The well point 10 has an elongated cylindrical construction wherein the end fittings 12 and 14 have the same diameter as the central portion 16 to provide a flush, smooth connection between the components. The central element of the well point is comprised of an elongated, hollow tube 18 having a rectangular cross-sectional configuration. An integral rib 20 extends the entire length of each side of the tube 18 along the middle of the external surface of each side. The corners 22 of the hollow tube 18 are beveled or slightly rounded so as to provide a smooth complementary fit with the internal surface of an outer cylindrical element as will be described hereinafter. A pair of elongated slots 24 are formed in each side of the rectangular, hollow tube 18 adjacent the lower end thereof on opposite sides of the protruding rib 20. The hollow tube 18 may be of any desired length and is preferably constructed as a one piece extruded member of polyvinyl chloride (PVC).

Figure 2:
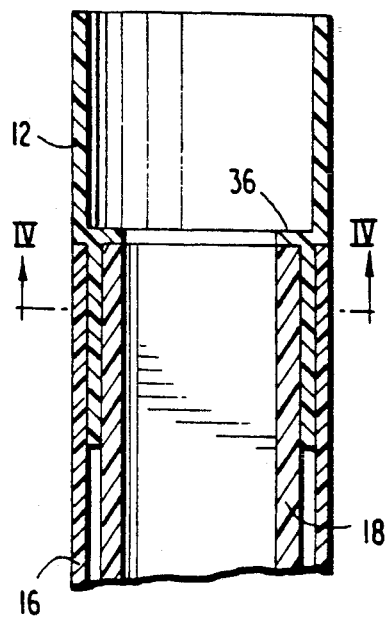
FIG. 2 is a sectional view taken along the line II—II in FIG. 1.
Figure 4:
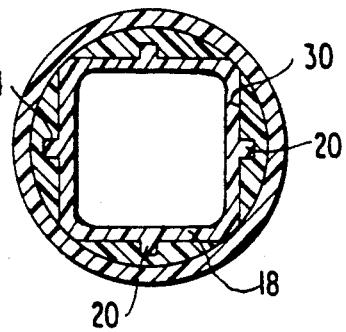
FIG. 4 is a sectional view taken along the line IV—IV in FIG. 2.

The upper and lower end fittings 12 and 14 are also constructed as hollow, tubular extruded members of PVC. The upper end fitting 12 is provided with a large diameter portion 26 having smooth, continuous, internal and external cylindrical surfaces. The lower portion 28 is provided with a reduced diameter cylindrical outer surface and a substantially rectangular inner surface 30 complementary to the outer surface of the hollow tube 18. Four equally spaced slots 32 are formed in the lower portion 28 having a width substantially equal to the width of the rounded edges 22 on the hollow tube 18. Each side of the rectangular inner surface of the lower portion 28 is provided with a longitudinal groove 34 adapted to snugly receive a corresponding rib 20 on the hollow tube 18. An inwardly extending flange 36 is provided adjacent the junction of the larger diameter portion 26 and the smaller diameter portion 28 which provides a stop for the end of the hollow tube 18 when it is inserted in the lower portion 28 of the upper fitting 12. When the hollow tube 18 is fitted within the portion 28 of the end fitting 12, the rounded corners 22 of the hollow, rectangular tube 18 are located in the slots 32 to provide a smooth, cylindrical external surface with the cylindrical outer surface of the portion 28. FIGS. 2 and 4 show the relationship of the hollow, rectangular tube 18 with respect to the upper end fitting 12 when joined together.

Figure 3:
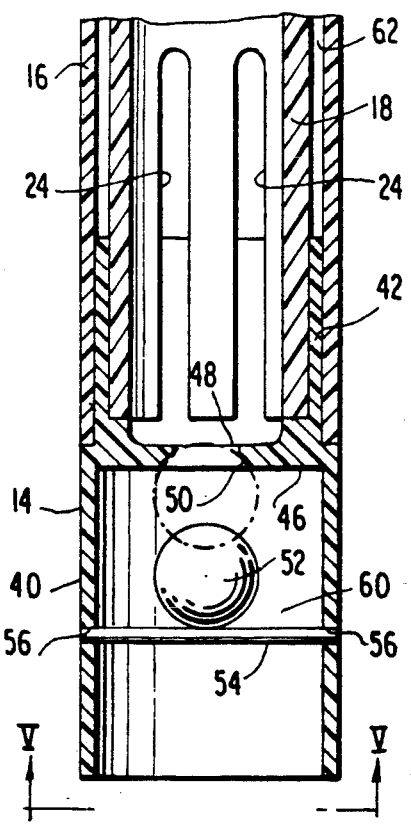
FIG. 3 is a sectional view taken along the line III—III in FIG. 1.
Figure 5:
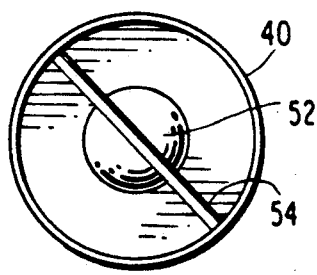
FIG. 5 is an end view taken in the direction of the arrows V—V in FIG. 3.
Figure 6:
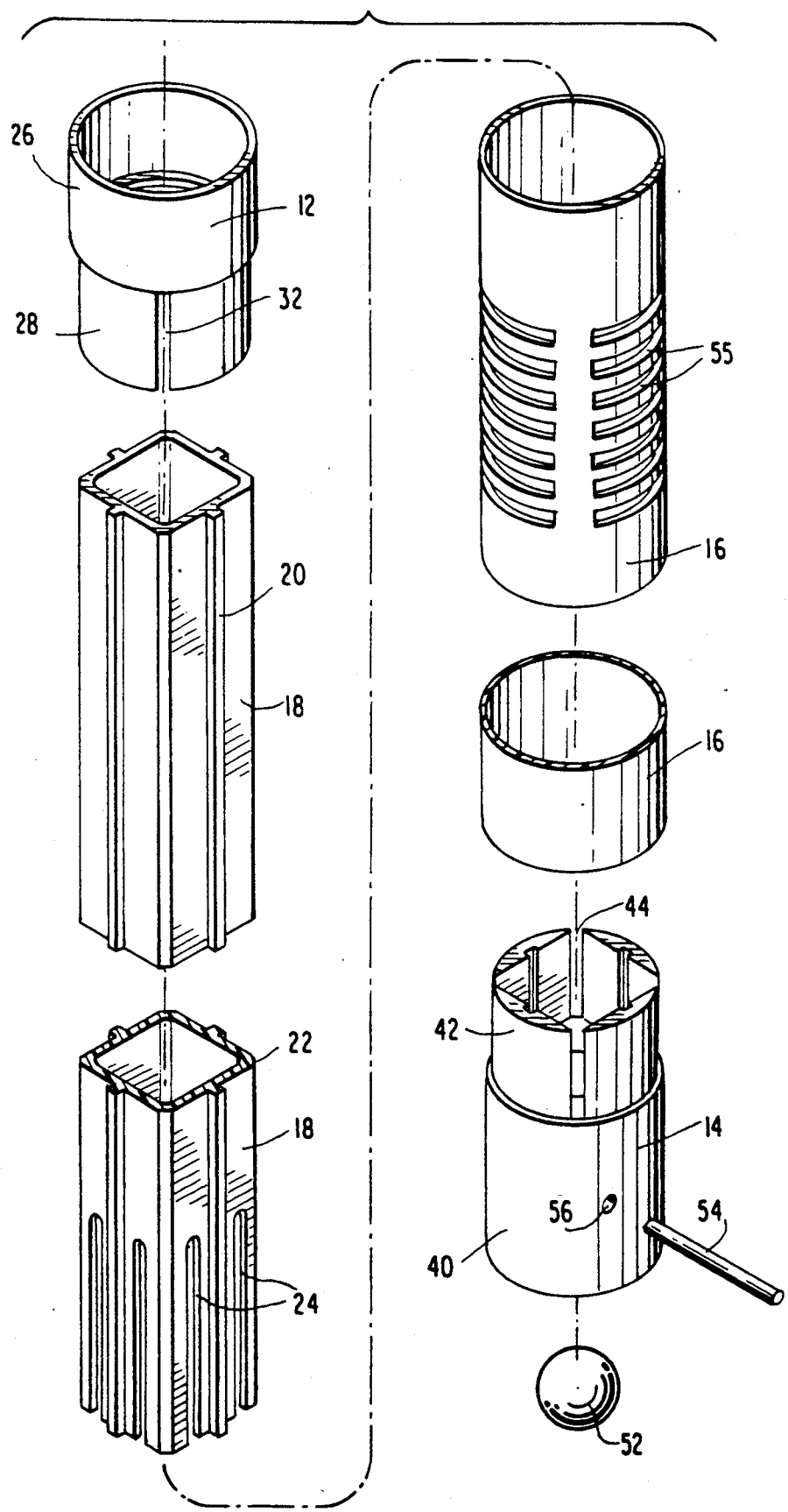
FIG. 6 is an exploded perspective view of the well point construction.

The lower end fitting 14 is provided with a lower end portion 40 having a cylindrical inner and outer surface defining a valve chamber. The lower end fitting 14 is provided with an upper portion 42 having a reduced diameter, cylindrical outer surface with four equally spaced grooves 44 extending therethrough. Thus, the portion 42 of the lower end fitting 14 is substantially identical to the lower portion 28 of the upper fitting 12 which was described in detail above. Thus, when the hollow, rectangular tube 18 is inserted in the portion 42 of the lower end fitting 14 against a flange 46, the relationship of the members is best seen in FIG. 3. The flange 46 which is located at the junction between the reduced diameter portion 42 and the larger diameter portion 40 is provided with an aperture 48 having a beveled valve seat 50. A spherical valve member 52 has a diameter such that the external surface thereof fits tightly against the beveled valve seat 50 in the flange 46. A transversely extending pin 54 is secured in diametrically opposed holes 56 in the larger diameter portion 40 to hold the spherical valve member 52 within the valve chamber.

A hollow, cylindrical screen member 16 has an inner diameter substantially identical to the outer diameter of the reduced diameter cylindrical portion 28 of the upper end fitting 12 and the upper reduced diameter portion 42 of the lower end fitting 14. The upper and lower ends of the screen member 16 and the hollow tube 18 are secured to the upper and lower fittings 12 and 14 by means of a suitable PVC cement. The hollow, cylindrical screen member 16 is provided with a plurality of transverse slots to allow the passage of water therethrough. Each slot is transversely cut into the tube with opposed slots being spaced from each other a sufficient distance to provide a sufficiently strong connecting strip 56 therebetween. The slots may be clustered as shown in FIG. 1 so as to provide longitudinally spaced supporting bands 58 which extend completely about the circumference of the tube.

The well point is assembled by placing the spherical valve element 52, which also may be constructed of PVC, within the valve chamber 60 and inserting the pin 54 through the diametrically opposed holes 56. The opposite ends of the pin 54 may be secured within the holes 56 by means of the PVC cement. The lower end of the rectangular tube 18 and the lower end of the cylindrical screen member 16 are then fitted onto the upper end portion of the lower fitting 14 and secured thereon by means of PVC cement. The upper end fitting 12 is then connected to the rectangular tube 18 and the cylindrical tube 16 by inserting the reduced diameter portion 28 therebetween and securing the elements together by means of PVC cement. Suitable fittings may be secured to the upper end fitting 12 which enable the well point to be connected to a pipe or hose which in turn is connected to suitable pumping means which are well known in the art.

With the parts thus assembled, the well point may be sunk into the ground by forcing water under pressure through the tube 18 past the valve member 52 so that it issues as a jet on the lower end of the end fitting 14 to penetrate loose soil and permit the well point to be forced further into the ground. Having sunk the well point to a selected level, water may be extracted from the surrounding earth by connecting a suction pump to the upper end fitting 14 of the well point so that water will be drawn through the screen member 16 and thence downwardly through the slots 24 in the lower end of the tube 18. When pressure is discontinued within the tube 18 and suction applied, the valve member 52 will move upwardly into engagement with the valve seat 50. Thus, the suction pump will draw the water within the tube 18 upwardly through the upper end fitting 12 to the surface. The elongated slots 24 may be of any suitable length but are generally formed with an axial length approximately twice the axial length of the reduced diameter fitting portion 42. Thus, the direct connection between the interior of the tube 18 and the space between the tube 18 and the screen 16 permits the very rapid drawdown of the water in the space 62 between the tubes 16 and 18 and the application of a strong suction within the tube 18 for moving a large volume of water to the surface in a short period of time. Likewise, the same construction permits a strong, reverse flushing action for cleaning the slots 55 when water under pressure is forced downwardly through the upper end fitting 12 into the tube 18.

Since all of the components of the well point assembly are constructed of PVC material, the entire assembly of the well point can readily take place at the site where the drainage is to occur. The well point may be custom made at the site since the PVC tubes can readily be cut to any desired length, depending upon the intended application. It is obvious that the detailed construction and arrangement of the slots within the tube 18 and the slots 55 within the cylindrical tube 16 may vary and other types of screening can be used. However, the use of the PVC screening tube is preferred since all of the components can then be readily interconnected by means of PVC cement to provide an efficient, lightweight assembly.

While the invention has been particularly shown and described with reference to preferred embodiments thereof, it will be understood by those in the art that the foregoing and other changes in form and details may be made therein without departing from the spirit and scope of the invention.

What is claimed is:

1. A well point assembly comprising:
   a hollow elongated tube having a plurality of slots extending from one end of said tube;
   upper and lower end fittings connected to opposite ends of said tube with said slots being partially covered by said lower end fitting;
   said lower end fitting having an apertured transverse wall defining a valve seat and including a valve member movable into and out of engagement with said valve seat; and
   perforated tubular screen means surrounding said tube with opposite ends thereof connected to said upper and lower end fittings with said screen means and said fittings having the same external diameter to provide a smooth flush connection therebetween;

said tube, said upper and lower end fittings and said screen means each being constructed of plastic material and being rigidly connected with each other by means of a cement;

whereby upon application of a suction to said upper end fitting, said valve member will be disposed in sealed engagement with said valve seat to permit water to be drawn through said screen means and said slots to be pumped upwardly through said tube and said upper end fitting.

2. A well point assembly as set forth in claim 1, wherein said hollow elongated tube of plastic material has a substantially rectangular cross-section with an elongated rib of integral one piece construction with said tube protruding outwardly from the central portion of each side along the entire length thereof and said upper and lower end fittings have substantially rectangular cross-sectional internal recesses with corresponding grooves for receiving opposite ends of said tube with said ribs extending into said grooves.

3. A well point assembly as set forth in claim 2, wherein said tubular screen means has a plurality of transverse slits therein defining openings for the passage of water.

* * * * *